(12) United States Patent
Schwartz et al.

(10) Patent No.: US 11,794,623 B2
(45) Date of Patent: Oct. 24, 2023

(54) DELIVERY VEHICLE AND FACILITY LOADING AND UNLOADING SHELF SYSTEM

(71) Applicant: United States Postal Service, Washington, DC (US)

(72) Inventors: William Schwartz, Tucson, AZ (US); Amy Longshore, San Diego, CA (US); Erika Thoeny, Evanston, IL (US); Sierra Raney, Blacksburg, VA (US); Michael Nagy, Merrifield, VA (US); Andrew Garcia, Tucson, AZ (US)

(73) Assignee: United States Postal Service, Washington, DC (US)

( * ) Notice: Subject to any disclaimer, the term of this patent is extended or adjusted under 35 U.S.C. 154(b) by 198 days.

(21) Appl. No.: 17/308,432

(22) Filed: May 5, 2021

(65) Prior Publication Data
US 2021/0253015 A1   Aug. 19, 2021

Related U.S. Application Data

(62) Division of application No. 16/154,573, filed on Oct. 8, 2018, now Pat. No. 11,027,640.

(60) Provisional application No. 62/570,437, filed on Oct. 10, 2017.

(51) Int. Cl.
| | | |
|---|---|---|
| G06F 7/00 | (2006.01) | |
| B60P 1/64 | (2006.01) | |
| G06Q 10/087 | (2023.01) | |
| G06Q 10/083 | (2023.01) | |
| G06Q 10/04 | (2023.01) | |
| G06Q 50/28 | (2012.01) | |
| F21S 4/28 | (2016.01) | |
| F21Y 115/10 | (2016.01) | |
| B60P 3/00 | (2006.01) | |

(52) U.S. Cl.
CPC .......... *B60P 1/6481* (2013.01); *B60P 1/6409* (2013.01); *G06Q 10/04* (2013.01); *G06Q 10/083* (2013.01); *G06Q 10/087* (2013.01); *G06Q 50/28* (2013.01); *B60P 3/007* (2013.01); *F21S 4/28* (2016.01); *F21Y 2115/10* (2016.08)

(58) Field of Classification Search
CPC ....... B60P 1/6481; B60P 1/6409; B60P 3/007; G06Q 10/04; G06Q 10/083; G06Q 10/087; G06Q 50/28; F21S 4/28; F21Y 2115/10
USPC ......................................... 700/213–216, 228
See application file for complete search history.

(56) References Cited

U.S. PATENT DOCUMENTS

| | | | |
|---|---|---|---|
| 10,148,918 B1* | 12/2018 | Seiger ..................... | H04N 23/56 |
| 10,358,290 B2* | 7/2019 | Lee ......................... | B65G 1/137 |
| 2012/0030133 A1* | 2/2012 | Rademaker ............ | G06Q 10/08 |
| | | | 705/333 |
| 2016/0232479 A1 | 8/2016 | Skaaksrud | |
| 2017/0107056 A1* | 4/2017 | Kadaba ................... | B60P 1/52 |

* cited by examiner

*Primary Examiner* — Yolanda R Cumbess
(74) *Attorney, Agent, or Firm* — Knobbe Martens Olson & Bear LLP

(57) ABSTRACT

Vehicle shelf systems having indicators thereon for improving loading and delivery efficiency. Items are scanned for loading, and the indicators on the vehicle shelves identify where to place the item based on the sequence of the delivery point along the delivery route. A mobile computing device alerts a delivery carrier when the delivery vehicle is in proximity to a delivery point when an item is to be delivered.

16 Claims, 13 Drawing Sheets

| | Barcode | PLength | PWidth | PHeight | Weight | Address | ZIP |
|---|---|---|---|---|---|---|---|
| ▲ | 42022082940011020079343437532 7 | 27 | 8.5 | 3.5 | 2 | 13744 COMUNA DRIVE | 92064 |
| * | 42022082940011020088237932090 2 | 8 | 6 | 3 | 1 | 13750 COMUNA DRIVE | 92064 |

MailPiece 560
562
564
566

FIG. 5A

Sequence Data 580

| Stop Number | Address | ZIP |
|---|---|---|
| 1 | 13742 COMUNA DRIVE | 92064 |
| 2 | 13744 COMUNA DRIVE | 92064 |
| 3 | 13746 COMUNA DRIVE | 92064 |
| 4 | 13748 COMUNA DRIVE | 92064 |
| 5 | 13750 COMUNA DRIVE | 92064 |
| * | | |

DELIVERY VEHICLE AND FACILITY LOADING AND UNLOADING SHELF SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a divisional of U.S. application Ser. No. 16/154,573, filed Oct. 8, 2018, which claims the benefit of priority to U.S. Provisional Application No. 62/570,437, filed Oct. 10, 2017, the entire contents all of which are hereby incorporated by reference.

BACKGROUND

Field

The present application relates to devices and methods for loading and unloading items to and from a shelf system, such as in a facility or a delivery vehicle.

SUMMARY

Some aspects described herein include a system for loading items which comprises a plurality of shelves, the shelves configured to receive one or more items, each of the plurality of shelves having an indicator thereon, the indicator comprising a plurality of indicating components; a mobile computing device configured to scan an item to be loaded and to generate scan information for the item to be loaded; a processor in communication with the mobile computing device and with the indicator; and a memory in communication with the processor, the memory storing a loading plan for the one or more items; wherein the processor is configured to receive the scan information from the scanner for the item to be loaded, to determine a proposed shelf location for the item to be loaded based on the scan information and the loading plan for the item to be loaded, and to actuate selected indicating components from the one or more indicating components, the selected indicating components corresponding to the proposed shelf location.

In some embodiments, the plurality of shelves are located on a delivery vehicle.

In some embodiments, the plurality of shelves are located in a distribution facility.

In some embodiments, the indicating components comprise a plurality of light emitting diodes aligned along a length of each of the plurality of shelves.

In some embodiments, the processor is further configured to determine, from the scan information, a dimension of the item to be loaded, and to actuate one or more of the plurality of light emitting diodes along the length of one of the plurality of shelves based on the determined dimension of the item.

In some embodiments, the system further comprises a sensor located on each of the plurality of shelves, the sensor configured to sense the presence of items on the shelves and to communicate the sensed presence of items to the processor.

In some embodiments, the processor is configured to generate the loading plan based on the received scan information and to store the loading plan in the memory.

In some embodiments, the processor is further configured to generate a loading plan by segmenting the plurality of shelves into segments having a fixed length, the fixed length corresponding to the distance between pairs of the plurality of indicating components along the length of the shelf, and to determine a proposed shelf location by allocating one or more of segments on one of the plurality of shelves according to a dimension of the item to be loaded.

In another aspect described herein, a method of loading a vehicle comprises scanning a label on an item to be loaded into a vehicle, the vehicle comprising a plurality of shelves; obtaining item information based on the scan of the label; determining a proposed shelf location for the item on one of the plurality of shelves based on the item information; actuating one or more indicating components disposed on the plurality of shelves, wherein the one or more actuated indicating components correspond with the proposed shelf location for the item; and placing the item on the one of the plurality shelves in the proposed shelf location.

In some embodiments, the one or more indicating components comprise a plurality of light emitting diodes aligned along a length of each of the plurality of shelves.

In some embodiments, the item information comprises a dimension of the item to be loaded.

In some embodiments, actuating the one or more indicating components comprises activating a number of the plurality of light emitting diodes based on the dimension of the item to be loaded.

In some embodiments, the item information comprises a stop sequence number associated with a delivery point to which the item is intended to be delivered.

In some embodiments, the method further comprises generating an indication that the item has been loaded into the proposed shelf location.

In some embodiments, generating the indication that the item has been loaded into the proposed shelf location comprises sensing, via one or more sensors disposed on the plurality of shelves, the presence of the item.

In some embodiments, the method further comprises delivering the item to be loaded to a delivery point associated with an intended recipient of the item.

In some embodiments, delivering the item comprises detecting a location of the vehicle along a delivery route; determine whether the location of the vehicle is within a defined distance to the delivery point associated with the intended recipient of the item; providing an alert via the mobile computing device if the location of the vehicle is within the defined distance to the delivery point associated with the intended recipient of the item; and actuating one or more indicating components corresponding to the item's location on the plurality of shelves.

In another aspect described herein, a system for delivering items comprises a plurality of items stored on a plurality of shelves in a delivery vehicle, each of the plurality of shelves including an indicator, the indicator comprising a plurality of indicating components; a mobile computing device comprising a geographic location system; a memory storing a location of each of the plurality of items stored on the plurality of shelves in the delivery vehicle; a processor in communication with the memory, wherein the processor is configured to: receive the geographic location of the mobile computing device; determine whether the geographic location of the mobile computing device is within a defined distance to the delivery point a delivery point to which one of the plurality of items is to be delivered; if the geographic location of the mobile computing device within the defined distance to the delivery point, query the memory to determine the location of the one of the plurality of items on the plurality of shelves; actuate selected ones of the plurality of indicating components corresponding to the location of the item to be delivered to the delivery point; and activate an alert on the mobile computing device indicating that there is an item to be delivered to the delivery point.

In some embodiments, the plurality indicating components comprise a plurality of light emitting diodes aligned along a length of each of the plurality of shelves.

In some embodiments, the processor is further configured to illuminate a set of the plurality of light emitting diodes extending along a length of one of the plurality of shelves a distance corresponding to a dimension of the item to be delivered to the delivery point.

BRIEF DESCRIPTION OF THE DRAWINGS

FIG. 5A depicts an embodiment of a table storing item information.

FIG. 5B depicts an embodiment of a table of addresses and stop locations.

DETAILED DESCRIPTION

Figure 1A:
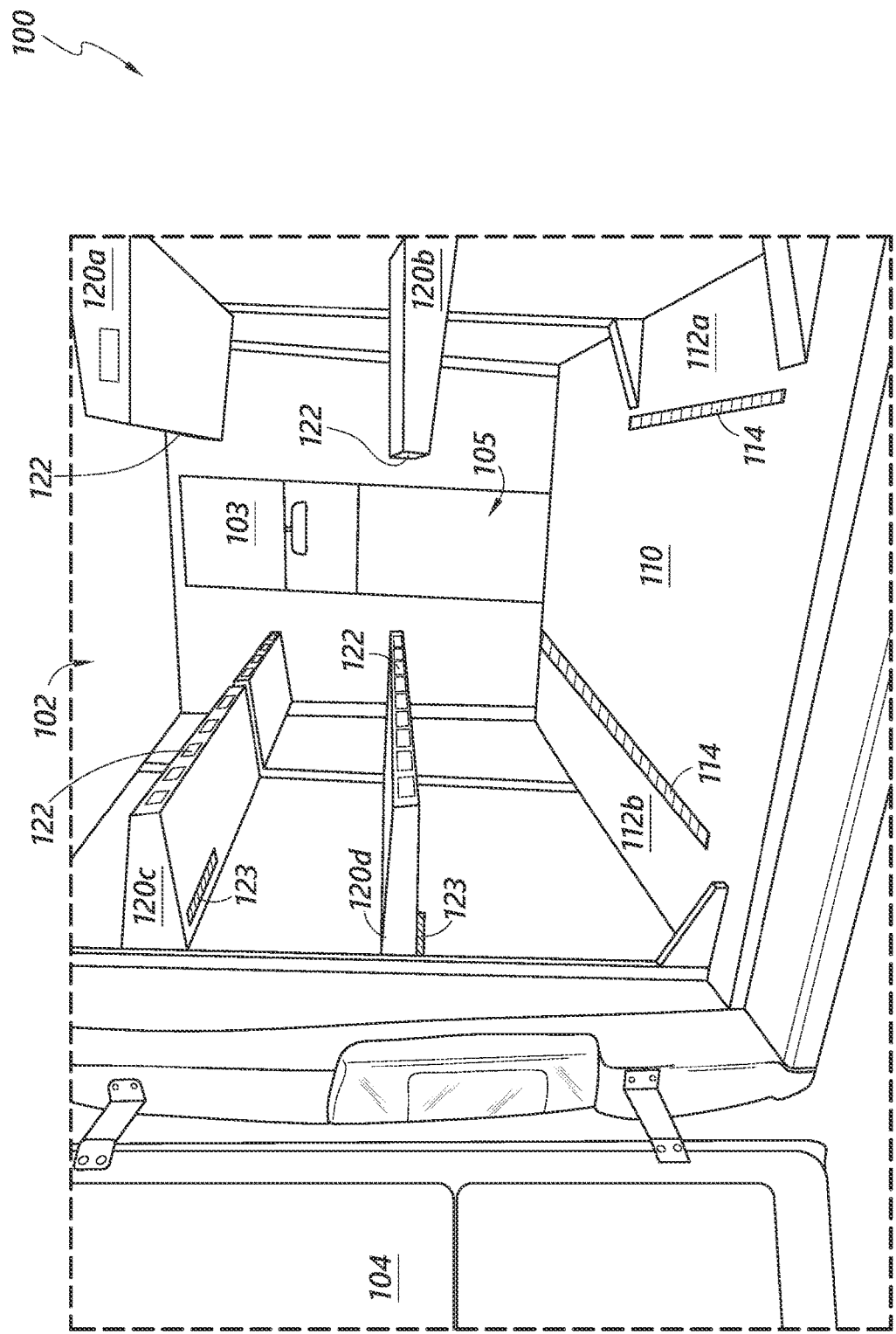
FIG. 1A is a perspective view of an open rear portion of a delivery vehicle having shelves for holding distribution items.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used herein, an item or a distribution item can be a parcel, a package, an envelope, a flat, a mailpiece, a box, a suitcase, or any other item that is routinely or commonly transported from one location to another by a distribution entity. A distribution entity may be an entity engaged in transporting items from one location to another, such as the United States Postal Service (USPS), another commercial carrier, a storage facility, a fulfillment warehouse, a luggage sorting facility, or any other similar facility, company, or entity.

Using the USPS as an example, an item, such as a parcel, mailpiece, or the like has a label thereon, or information printed directly on the item (also referred to herein as a "label"), which indicates, among other things, a sender, a delivery point (destination or address), a class of service, postage, a tracking code. The labels include can encode all or a part of the above information in one or more computer readable codes. In some embodiments, the labels can include a unique item identifier either encoded or non-encoded.

As used herein, a distribution network may comprise multiple levels. For example, a distribution network may comprise regional distribution facilities, delivery hubs, and unit delivery facilities, or any other facility at an intermediate level in the distribution network. For example, a nationwide distribution network may comprise one or more regional distribution facilities having a defined coverage area (such as a geographic area), designated to receive items from intake facilities within the defined coverage area or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the United States Postal Service, the unit delivery facility may be associated with a ZIP Code. The unit delivery facility can induct items from local senders, and receive items from hub level facilities and/or regional distribution facilities. The unit delivery facility also sorts and stages the items intended for delivery to destinations within the unit delivery facility's coverage area.

Delivering items, such as packages or parcels, may require manually loading the packages or parcels into a delivery vehicle at a distribution facility. As a vehicle may have multiple stops along a delivery route, it can save time to load packages that are to be delivered later in the route further in the vehicle, and packages to be delivered earlier on the route near the rear door of the vehicle. This loading scheme can require the delivery resource, such as a mail carrier, to have a detailed understanding the route and the sequence of the delivery points along the route, in order to know which packages should be loaded into the vehicle first, and which should be loaded later. A new carrier or a substitute carrier may be unfamiliar with the route, and may not load the vehicle efficiently. This can result in additional time on the delivery route, as the carrier searches through the vehicle to find the items intended for delivery to a particular delivery point. Further, efficient loading may be difficult when the volume of packages is high. Additionally, packages come in various shapes and sizes, which can complicate the vehicle loading process.

When items cannot be or are not intended to be delivered to delivery points, they can be delivered to a distribution network facility to be picked up by the intended recipients. In the example of the USPS, this can be a post office. An intended recipient may receive an indication from the USPS that there is an item at the post office to be picked up. The post office may have an area with a plurality of shelves and/or other designated storage locations for storing items which are to be picked up. When an intended recipient arrives to pick up an item, the postal worker may need to sort through a large number of items on the plurality of shelves or storage locations to identify the item for the intended recipient. This can increase the time a recipient spends waiting, and can be inefficient.

The systems and methods described herein, in some aspects, can improve vehicle loading time and to reduce the time spent looking for a package while a carrier is out on the delivery route or in a distribution facility. For example, the delivery vehicle can have shelving units and floor areas having indicators thereon. The indicators can be lights or other indicators that can be activated or illuminated as required. When a carrier or other entity is loading packages on to the vehicle, the carrier scans a label on the item. After the label is scanned, one or more indicators on the shelves in the vehicle will illuminate to indicate to a carrier where to put a package. Additionally, when the vehicle is out for delivery, the carrier can be alerted when the vehicle comes within a geofence around or proximity to a delivery point. When there is a package on the vehicle intended for delivery at that delivery point, the indicators can illuminate to show where the package is that is to be delivered at the delivery point. These and other processes will be described in greater detail below.

FIG. 1A depicts a view of the rear portion of a delivery vehicle having shelves therein. The vehicle 100 can be similar to a USPS delivery truck. The vehicle 100 has a cargo portion 102 and a driver portion 103, with the driver portion 103 positioned forward or ahead of the cargo portion 102. The cargo portion 102 is accessible from the driver portion 103 via a doorway 105. The cargo portion 102 is accessible from outside the vehicle 100 via a door 104.

Within the cargo portion 102 are a floor 110 and a plurality of shelves 120a-d. The floor 110 can be the floor of the vehicle 100, and has storage areas 112a and 112b. The storage areas 112a and 112b can be designated by a marking material, such as tape, by markings on walls of the cargo portion 102, or by any other desired delineation mechanism. The storage areas 112a and 112b can be bounded, bordered, or lined by one or more floor indicators 114.

The plurality of shelves 120a-d can each have an indicator 122 disposed on a surface thereof. The plurality of shelves 120a-d can also include one or more sensors 123 attached to a surface of one or more of the shelves 120a-d or attached proximate one or more of the plurality shelves 120a-d. The sensors 123 can be photoelectric sensors, ultrasonic sensors, weight sensors, cameras, and the like. The one or more sensors 123 are configured to identify when an item, such as a package, is placed on or removed from one of the plurality of shelves 120a-d.

Although FIG. 1A depicts a plurality of shelves 120a-d in a delivery vehicle, a person of skill in the art, guided by this disclosure, will understand that the plurality of shelves 120a-d and the features described herein can be in a distribution facility, such as a post office or sorting facility.

Figure 1B:
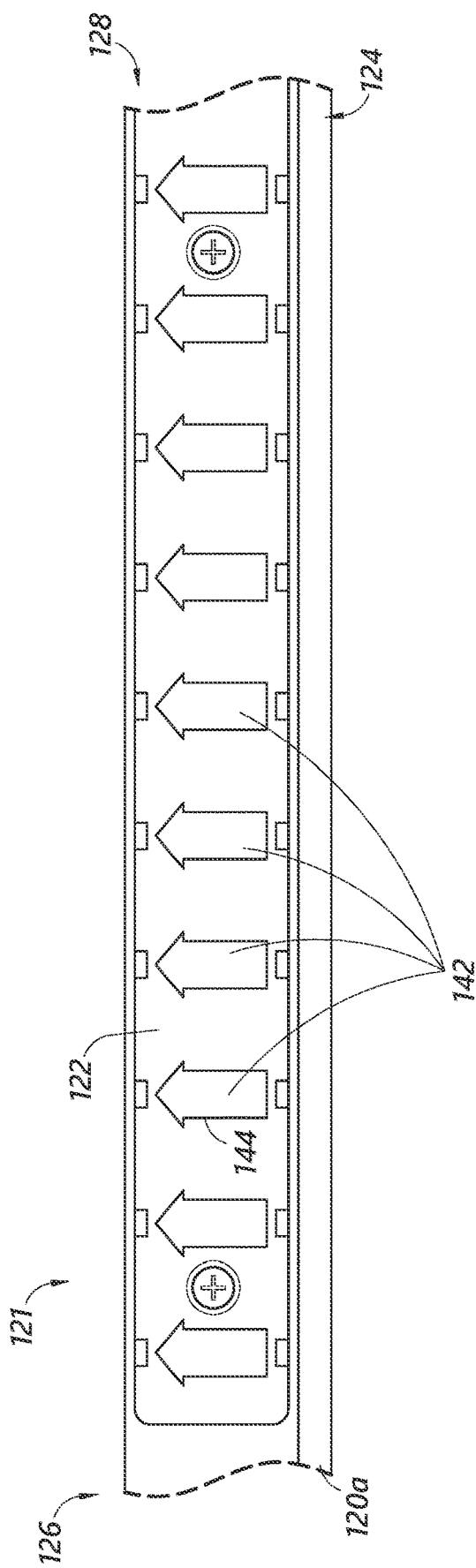
FIG. 1B is a close up view of an embodiment of an indicator on a shelf in a delivery vehicle.

FIG. 1B depicts a close up view of one of the plurality of shelves 120a-d. The shelf 120a has an indicator 122 attached to a front edge 124 of the shelf 122a. The indicator 122 extends along a length of the shelf 120a from a first end 126 of the shelf to a second end 128 of the shelf. The shelf 120a as well as the indicator 122 can extend beyond the area designated as a second end 128 depicted in FIG. 1B. in some embodiments, the indicator 122 extends along the entire front edge 124 of the shelf 122a.

The indicator 122 may comprises a plurality of indication devices, such as light emitting diodes (LEDs) 142. Although described here as LEDs, the indication devices in the indicator 122 can be a variety of lights, such as incandescent bulbs, a liquid crystal display, e-ink, or any other desired indicator. In some embodiments, the LEDs 142 are a plurality of discrete units extending in one or more rows along the length of the indicator 122. In some embodiments, the LEDs 142 are individually actuateable LEDs 142. The LEDs 142 are powered from a power source (not shown) and are in electrical communication with and are under the control of a processor which controls activation and deactivation of the LEDs 142.

The LEDs 142 are spaced apart along the length of the indicator 122 and the shelf 122a. in some embodiments, the LEDs 142 are spaced at a known or fixed distance apart, for example, from centerline to centerline of each LED 142. In some embodiments, the LEDs 142 can have a separation of 1 cm, ½ inch, 1 inch, or any other desired spacing. The spacing or separation can be determined based on the length of the shelf 122a.

The LEDs 142 can be framed or surrounded by a plurality of outlines 144. The outlines 144 can take a variety of shapes and sizes. In some embodiments, each individual LED 142 is framed by a single outline 144. In some embodiments, the outlines 144 form a shape, such as an arrow, as depicted, which indicates in which direction the top shelf surface 121 is located, on which the package should be placed. For example, if the indicators have outlines 144 depicting arrows pointing up, then the item should be loaded onto the top shelf surface 121 onto the shelf 120a-d from above. If the indicators 122 have outlines 144 depicting arrows pointing down, then the item should be loaded onto the shelf below the indicator, or in one of the floor storage areas 112a-b.

The floor indicators 114 can be similar to the indicators 122 described above. In some embodiments, the floor indicators 114 can be rope lights, or other similar devices which at least partially outline or border the storage areas 112a and 112b, and which can be actuated partially or individually to indicate where an item should be placed.

In some embodiments, the indicators 122 and the floor indicators 114 can be computer readable codes, alphanumeric identifiers, and the like. For example, the indicators 122 can identify shelves with a scannable barcode and/or an alphanumeric shelf identifier. Such indicators 122 will uniquely identify a shelf 120a-d within the vehicle 100 or within a distribution facility. In some embodiments, the indicators 122 can comprise any combination of computer readable codes, alphanumeric identifiers, and LEDs 142.

Figure 1C:
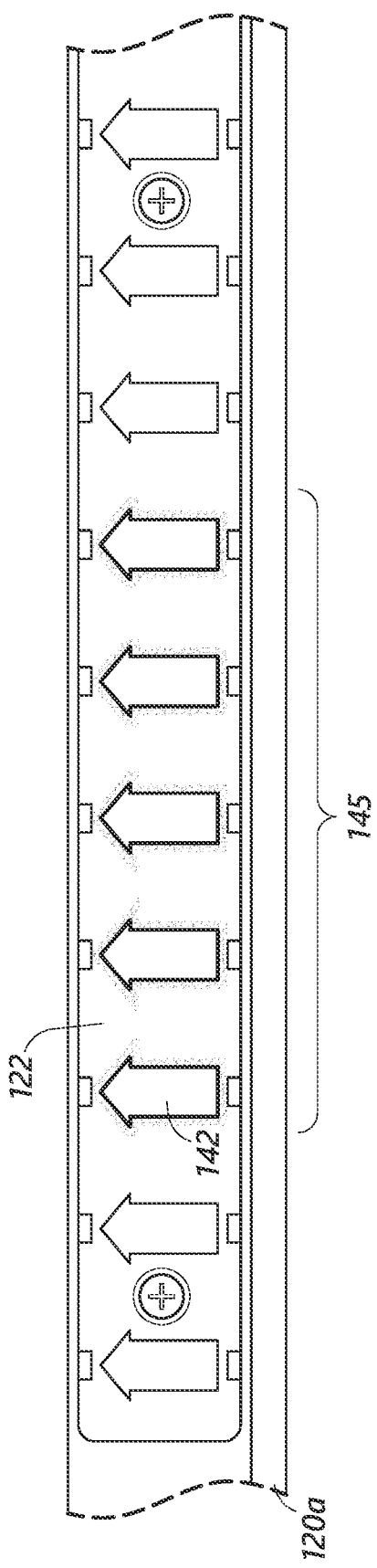
FIG. 1C is a close up view of an embodiment of an illuminated indicator on a shelf in a delivery vehicle.

FIG. 1C depicts the portion of the shelf 120a shown in FIG. 1B having a shelf section or shelf location 145 indicated for receiving an item by illuminating a defined or specific plurality of LEDs 142. The operation and use of the indicators 122 will be described in greater detail below.

Figure 2:
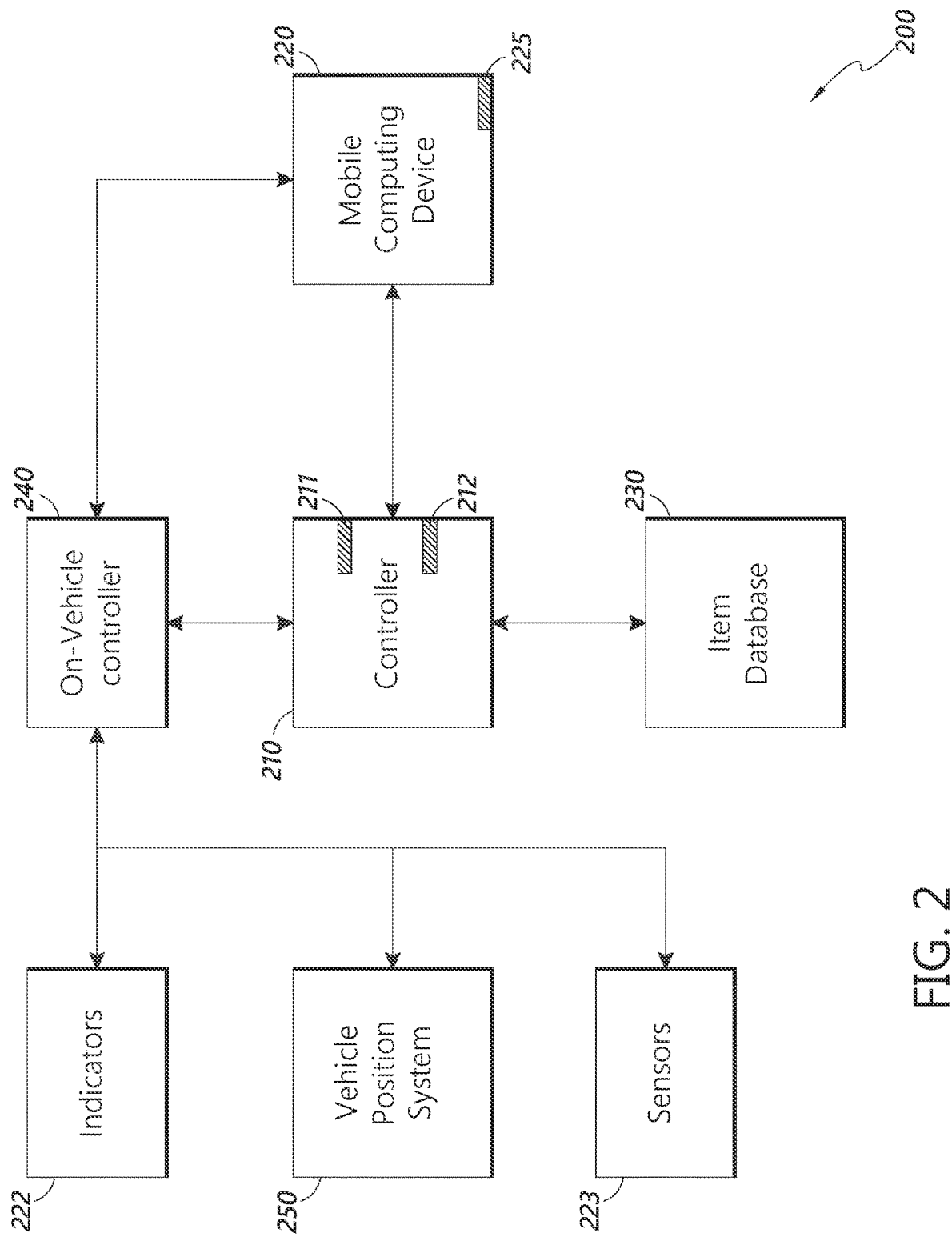
FIG. 2 is a block diagram of an embodiment of a system for loading a vehicle and delivering items.

FIG. 2 depicts a control system for controlling the loading and delivery operations and controlling the indicators 122. A control system 200 comprises a controller 210, a mobile computing device 220, an item database 230, an on-vehicle processor 240, indicators 222, sensors 223, and a vehicle position system 250.

The controller 210 may be located at or associated with any level, or with multiple levels of the distribution entity. The controller 210 may comprise or be a component of a processing system implemented with one or more processors. The controller 210 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable controller 210 may comprise a processor such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processor typically has conventional address lines, conventional data lines, and one or more conventional control lines. The processor may be in communication with a processor memory which may include, for example, RAM memory, flash memory, ROM memory, EPROM memory, EEPROM memory, registers, hard disk, a removable disk, a CD-ROM, or any other form of storage medium known in the art. The processor memory may include, for example, software, at least one software module, instructions, steps of an algorithm, or any other information. In some embodiments, the processor performs processes in accordance with instructions stored in the processor memory. These processes may include, for example, controlling features and/or components of the expected control system 100, and controlling access to and from, and transmitting information and data to and from the controller 100 and the constituent components of the system 200, as will be described herein.

The controller can also comprise a communication feature 212. The communication feature 212 is configured for wired and/or wireless communication with the components of the control system 200. In some embodiments, the communication feature 212 communicates via telephone, cable, fiber-optic, or any other wired communication network. In some embodiments, the communication feature 212 may communicate via cellular networks, WLAN networks, or any other wireless network. The communication feature 212 is configured to receive instructions and to transmit and receive information among components of the control system 200, and in some embodiments, with a central server (not shown) or other resource outside the control system 200, as desired.

The mobile computing device 220 can be any mobile computing device, such as a smartphone, tablet computer, and the like. In some embodiments, the mobile computing device can be a specialized hardware device designed for and carried by delivery carriers. The mobile computing device 220 includes a location module 225 which provides location detection capability, such as GPS, AGPS, Wi-Fi positioning, multilateration, etc. The mobile computing device 220 can incorporate a scanning capability, such as a laser-type barcode scanner, an optical camera, or other type of sensor to detect and decode computer readable codes. In some embodiments, the mobile computing device 220 may communicate with the controller 210 via cellular networks, WLAN networks, or any other wireless network.

The item database 230 can be a database having a memory and a processor. The item database 230 can be a separate device, a memory accessible to the controller 210, or it can be part of the controller 210. The item database 230 stores information about items, such as packages and parcels, within the distribution network. Item information can include one or more of the following: item size, weight, description, sender, recipient, intended destination/delivery point, origination point, return address, a tracking number, a unique identifier, class of service, postage status, and the like. The item database 230 can store the item information for each item, or for a plurality of items, that are available or intended for delivery to delivery points within or serviced by the distribution network.

The item database 230 can also store route information for delivery routes serviced by carriers. As an example, a controller 210 and/or an item database 230 can be associated with a unit delivery facility, such as a local post office. The route information for each route serviced by the unit delivery facility, including the delivery points along each route, and the order of the delivery points along the delivery route, can be stored in the item database 230.

The item database 230 can also store information about the items being loaded and unloaded to and from a vehicle or distribution facility as they are scanned by the mobile computing device 220. This process will be described in greater detail herein.

The on-vehicle controller 240 can be similar to the controller 210 described herein. The on-vehicle controller 240 is located on a delivery vehicle, and can be integrated into the vehicle's existing computer systems or it can be an additional system added to the vehicle. The on-vehicle controller 240 stores information about the specific shelving and floor space arrangement and indicators 222 in the vehicle in which the on-vehicle controller 240 is installed. For example, the on-vehicle controller stores the number of shelves 120a-d, the amount of shelf space and/or floor space, in linear distance and/or area, the distance between shelves, and the like. In some embodiments, the shelves 120a-d can be divided into equal sized segments to create equal sized shelf segments onto which the packages will be placed. In some embodiments, space on the shelves 120a-d can be dynamically appropriated based on the dimensions of the items to be loaded on the shelf 120a-d and/or the known volume of items for loading. In some embodiments, the shelves 120a-d may have a portion which is pre-designated with a particular length segments where common sized parcels, such as USPS flat rate boxes or other standard/common parcel size, and the shelves 120a-d may have a portion of the shelf which is used for dynamic appropriation into dynamically sized segments.

The on-vehicle controller 240 controls the operation of indicators 222. Indicators 222 can be similar to indicators described elsewhere herein. The on-vehicle controller 240 can also store information regarding the shelves 120a-d and the storage areas 112a and 112b, such as their dimensions and locations. For example, the on-vehicle controller 240 can store information regarding the length of the shelf 120a-d and the number of indicators 222 per unit length, the height of one shelf 120a-d above or below another shelf 120a-d within the cargo portion 102 of the vehicle 100. This information can also be stored in the item database 230 or in another memory accessible by the controller 210.

Where the shelving systems and items are being used in a distribution facility, the on-vehicle controller 240 is a facility controller that stores information similar to that described with regard to the on-vehicle controller 240.

The sensors 223 can be similar to those described elsewhere herein. The sensors 223 are in communication with the on-vehicle controller 240, and are configured to detect the presence or absence of an item on the shelf to which the sensor 223 is attached, to which it is connected, or with which it is associated. The sensor 223 will send the detection of the presence or absence of an item to the on-vehicle controller 240.

The vehicle position system 250 can be a location system, such as GPS, that identifies the position of the vehicle and communicates the position to the on-vehicle controller 240. The on-vehicle controller 240, the mobile computing device 220, and/or the item database 230 can store information regarding the geographic coordinates of each delivery point along the delivery routes in order to provide a signal when the vehicle is near or at a delivery point, based on the geographic coordinates of the vehicle.

It will be understood that the control system 200 can have all of the components depicted, or that one or more of the components need not be present, and the functions of the components could be concentrated into one or more of the components, such that other components are not present. For example, the mobile computing device 220 can use its location module 222 to determine the location of the vehicle, as the carrier will generally carry the mobile computing device 220 with him or her in the vehicle and along the delivery route. In this instance, the vehicle may not need to have a separate vehicle position system 250.

Figure 3:
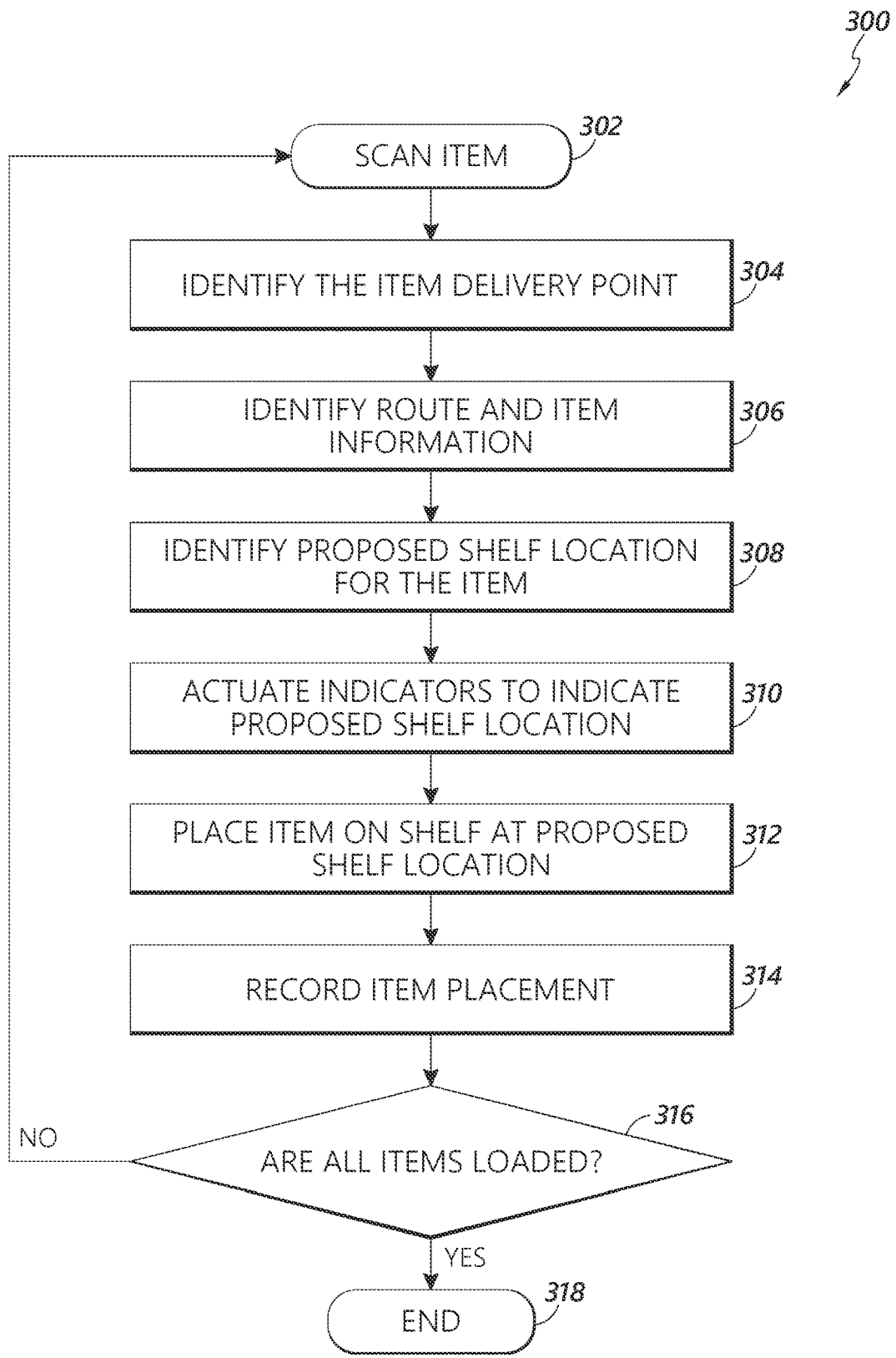
FIG. 3 is flow chart describing an exemplary process for loading a vehicle.

FIG. 3 depicts a flow chart of a process for loading an item on a vehicle 100. A process 300 begins in block 302 wherein an item to be delivered is scanned. In some embodiments, the carrier loading a vehicle has a plurality of items to load onto a single vehicle. In this case, the indicators on the shelves in the vehicle to be loaded will indicate where to place the scanned packages. In some embodiments, the scanning can occur at a dock, where there are a plurality of packages or items intended for delivery to a plurality of delivery points, and the packages will be loaded into multiple vehicles. In this case, the scanner can indicate which vehicle the package should be loaded into, and corresponding indicators in the specific vehicle will indicate where to load the package. In some embodiments, the scanning occurs at a distribution facility and packages are being sorted and/or stored to shelves within the distribution facility. In some embodiments, the scanning can occur at an induction point, a regional delivery facility, or a unit delivery facility.

In the example of loading a vehicle, step 302 can includes scanning a label on the item using a mobile computing device 220. The label can include human readable information and computer readable information. In some embodiments, the item can have one or the other, or both. The label can be attached to, adhered to, placed on, or printed directly on the item. In the case of human readable information, the mobile computing device 220 can be take an image of the item, and the label thereon, and perform optical character recognition (OCR) to identify the delivery point on the label. In the case of a computer readable information, the mobile computing device can take an optical image and OCR a barcode or other code, or can have a laser or light reader that reads and interprets the computer readable information. The mobile computing device 220 can interpret and/or decode the computer readable codes in an on-board processor, or the mobile computing device 220 can send a signal indicative of the read code to the controller 210, where it can be interpreted and/or decoded. The interpreted or decoded information can be used to read an item identifier associated with the label and the item on which the label is located.

The process 300 next moves to block 304, wherein the item delivery point is identified. In some embodiments, the item delivery point can be identified by using a scanned item identifier and looking up the associated information in the item database 230. The item database, as described above, stores information about the item and about the delivery point for the item. For example, the item identifier can be looked up in the item database 230 to determine what the intended delivery point for the item is. The item identifier on the label can be a unique identifier that has a record in a database stored in the item database 230, and the unique item identifier can be used to identify the delivery point associated with the unique item identifier.

In some embodiments, the computer readable code, such as an IMb™ may encode the delivery point, for example, using a ZIP+4+2 format, or other similar code. In some embodiments, the delivery point can be identified using the OCR'd image of the label. In some embodiments, the delivery point can be identified using two or more of the methods described.

Once the delivery point is identified in block 304, the process 300 moves to block 306, wherein the route and item information for the item is identified. When the delivery point is identified, the controller 210 can look up the route and item information in the item database 230.

When the delivery point is known, the controller 230 uses the delivery point to identify the route information for the delivery point, and, thus, for the item. The controller 210 looks up at what route the delivery point is assigned to, and what stop number the delivery point is along the route.

Upon identifying the route, the mobile computing device 220 can instruct a user of the mobile computing device 220 where to put the item so it can be placed on a correct vehicle, or can identify which vehicle the item should be on. In some embodiments, for example, where a carrier is loading a delivery vehicle 100 with items that have been sorted to the vehicle 100, the route need not be identified, and the mobile computing device 220 can confirm that the item is being loaded on the correct vehicle 100. The mobile computing device 220 can also provide an error message if an item is scanned that is not intended for a delivery point serviced by the vehicle 100 being loaded.

The process 300 then moves to block 308, wherein a proposed shelf location for the item is identified. The item database 230 stores the stop number of the delivery point along the route. The controller 210 communicates the stop number information to the on-vehicle controller 240. The on-vehicle controller 240 can determine a proposed shelf location on one of the shelves 120a-d or in a floor storage area 112a-b. The on-vehicle controller 240 determines the proposed shelf location using information regarding the delivery route, anticipated item volume for the delivery route, the delivery points and their stop numbers, item size, or any other desired factors. For example, where the scanned item is intended for a destination at the beginning of the route, the on-vehicle controller 240 may determine the proposed shelf location at a point on a shelf 120a-d or a floor storage area 112a-b near the back of the cargo portion 102, nearer the door 104 than the driver portion 103. If the item is intended for a delivery point which occurs later in the route, such as in the last half or last quarter, the on-vehicle controller 240 determines a potential item storage location which is nearer the front of the cargo portion, or nearer the driver portion.

Further, where an item has a size and/or weight that exceeds a determined threshold, the on-vehicle controller 240 can determine a proposed shelf location in one of the floor storage areas 112a-b. For example, where an item is too large to fit on a shelf 120a-d, is too heavy for the shelf, or exceeds a weight limit for a carrier to pull off a shelf, the on-vehicle controller can determine that the item should be placed in one of the floor storage areas 112a-b.

The on-vehicle controller 240 can also take into account the order of loading the item onto the vehicle 100 with reference to the total number of items to be loaded. For example, if the carrier scans an item early in the delivery process which is intended for delivery at an early stop number, the on-vehicle controller 240 can determine that the item should be placed on a high shelf 120a-d, so the item is out of the way of a carrier when loading subsequent items. If an early loaded item was placed in a floor storage area 112a-b, it may be stepped on, kicked, or present a tripping hazard or other obstacle during loading of subsequent items.

In some embodiments, in addition to receiving the item delivery point, the on-vehicle controller receives item information from the controller 210 or be mobile computing device 220. The item information can include item dimensions, weight, and/or special handling instructions. The on-vehicle controller 240 can include the item dimensions to determine the proposed shelf location. For example, if an item has a long dimension in one direction, the on-vehicle controller 240 can apportion an appropriate length of one of the shelves 120a-d to receive the item, and reserve that space for the item. In another example, if an item has a tall dimension, the on-vehicle controller 240 can apportion a portion of any of shelf 120a-d, or floor storage area 112a-b which can fit the item. If an item is too tall to fit on a top shelf 120a, 120c, the on-vehicle controller 240 can apportion a section of a lower shelf 120b, 120d to receive the item. Once a portion of the shelf is reserved for an item, the on-vehicle controller 240 can consider that portion of the shelf as occupied, and that shelf portion will not be available in determining proposed shelf locations for subsequent items.

In some embodiments, the scan of a computer readable code on the item can indicate whether the item has a standard size or shape. For example, if the item is a flat-rate shipping box, or other standardized box, or known size container, the scan of the label can communicate the box type, and the dimensions will be known. In some embodiments, certain shelves or parts of shelves can be designated with fixed-length segments for receiving items, and can be reserved for items which are standardized boxes. To illustrate, on a particular shelf, the on-vehicle controller 240 can apportion a section of a shelf into dynamically sized segments based on item size when determining a load plan or where to place an item. Another portion of the shelf can be pre-segmented into sizes corresponding to standardized boxes, and when determining proposed shelf locations for items having standardized boxes, the pre-segmented portions can be identified and illuminated as described herein.

In another example, if an item is heavy, or exceeds a predetermined weight threshold, the on-vehicle controller 240 can determine the proposed shelf location to be a portion of the floor storage areas 112a-b. In determining the floor storage area 112a-b as a proposed shelf location, the on-vehicle controller 240 can also use the dimensions of the item and apportion a section of the floor storage area 112a-b corresponding to a dimension of the item.

In some embodiments, the determination of the proposed shelf location described above is performed by the controller 210, and the proposed shelf location for each item is communicated to the on-vehicle controller 240 by the controller 210. For example, when the mobile computing device 220 scans an item, the controller 210 performs the proposed shelf location determination, and sends the proposed shelf location to the on-vehicle controller 240. The controller 210 may receive an identification of the vehicle 100 being loaded by receiving a scan signal or identifier for the vehicle 100 from the mobile computing device 220. This can occur with a carrier scanning a computer readable code on the vehicle 100, typing in a license plate or other vehicle identifier, or via a Bluetooth-type connection signal between the mobile computing device 220 and the on-vehicle controller 240, or other connection with the vehicle 100.

In some embodiments, the controller 210 receives from the distribution entity the items and item information for the route of the vehicle 100. The controller 210 can determine which items are to be loaded on a particular vehicle and can determine in advance of the actual loading process identify proposed shelf locations for each of the items before the items are scanned by the mobile computing device, and store these as a loading plan. Then, when an item is scanned before loading on the vehicle 100, the controller 210 receives the item identifier and communicates to the on-vehicle controller 240 the proposed shelf location for the item from the loading plan.

After a proposed shelf location is determined, the process moves to block 310, wherein the indicators 122, 114 indicate the proposed shelf location. In one example, the indicators 122, 114 are lights that illuminate a shelf location 145, similar to that depicted in FIG. 1C. As described, the proposed shelf location can appropriate a certain length of a shelf 120a-d. The on-vehicle controller 240 will instruct the indicators 122 to illuminate the portion of the shelf appropriated for the proposed shelf location. For example, if an item has a length of 12 inches, the on-vehicle controller 240 instructs an appropriate number of LEDs 142 to illuminate to indicate the 12 inch portion of the shelf appropriated for the item. Where the distance between LEDs 142 is one inch, for example, the on-vehicle controller 240 will instruct 12 LEDs 142 to illuminate at a certain point along the length of the shelf 120a-d. A similar process may occur in illuminating LEDs in the floor indicators 114.

In embodiments where the indicators are not LEDs, a person of skill in the art, guided by this disclosure, will understand how to cause the on-vehicle controller 240 to provide the appropriate indication of the proposed shelf location. For example, if the indicators 122 are LCD screens, the LCD screen can display the portion of the shelf 120a-d using arrows or brighter screen portions on the LCD screen. Where the indicators are spotlights or other type of lights, such as lights attached to the ceiling of the cargo portion 102, the lights can be activated to illuminate the proposed shelf locations. In some embodiments, the mobile computing device can display a shelf location or an alphanumeric identifier, which can correspond to an alphanumeric identifier on the shelf 120a-d.

By illuminating the indicators 122 on one of the shelves 120a-d, the carrier can know precisely where to put an item during a loading process. This can increase efficiency in loading the vehicle 100, as each package need only be handled once while loading, guess work of item placement can be eliminated, which reduces the time to load the vehicle 100.

In some embodiments, the indicated location may not be acceptable or available for a variety of reasons. If the indicated location on the shelf or the floor is not sufficient for the item or is not available, the carrier can input a request for an alternate location for the item using the mobile computing device interface. In this case, the controller 210 can determine a new proposed shelf location, and can, in some embodiments, remove the previous, but unavailable, shelf area from the loading plan.

The process 300 next moves to block 312 wherein the item placement is recorded. When item placement is recorded, the on-vehicle controller 240 can cause the illuminators 122, 114 to turn off. This provides a visual indication to the carrier that the loading process for that item is complete. If the indicators do not turn off, the carrier can investigate why the item placement has not been confirmed and take appropriate action.

Item placement can be recorded by one or more of the following methods. In some embodiments, the carrier, after placing the item on the shelf 120a-d at the proposed shelf location, can click, tap, or press a button on an interface on the mobile computing device confirming that the item has been placed at the proposed shelf location.

In some embodiments, the carrier can place the item on the shelf, at which point the presence of the item is detected by one or more of the sensors 223. The sensors 223 can send a signal indicating the presence of the item to the on-vehicle controller 240, which can then communicate with either the mobile computing device 220, or the controller 210, or both, to confirm the item has been loaded at the proposed shelf location. Upon confirmation, the on-vehicle controller 240 stores the completion of the loading of the item.

In some embodiments, the carrier can place the item on the proposed shelf location, and scan the item on the shelf, or can scan a code on the shelf where the item was placed. This can signal the loading process for the item is complete. In some embodiments, the carrier can scan the next item to be loaded. The scanning of the next item to be loaded can indicate to the on-vehicle controller 240 that the carrier has placed the item on the proposed shelf location, and that the loading of that item is complete. When the scan of the next item occurs, the proposed shelf location indicators can turn off for the first item, and illuminate the indicators 144 indicating the proposed shelf location of the next item.

In some embodiments, one or more of the above methods can be used at the same time to confirm item loading. For example, sensors 223 can be used to confirm load, and the mobile computing device 220 can require a button to be pressed to confirm item loading.

The process next moves to decision state 316, wherein it is determined whether all items have been loaded. The controller 210 can receive signals from the mobile computing device 210 and/or the on-vehicle controller 240 indicating that the loading of an item is completed, and storing the shelf location of the item. The controller 210 can receive this information and determine whether each of the items intended to be loaded on the vehicle 100 have been loaded. This determination can also be done at the on-vehicle controller 240 or in the mobile computing device 220, or by a combination of any of these components.

In some embodiments, this determination can be determined by a carrier upon visual inspection of the items to be loaded. The carrier can indicate on the mobile computing device 210 that all items have been loaded.

If it is determined that not all of the items intended for loading on the vehicle 100 have been loaded, the process 300 returns to block 302, and the process repeats. If it is determined that all of the items intended for loading on the vehicle 100 have been loaded, the process 300 moves to block 318 and ends.

After the vehicle is loaded and the carrier is out for delivery, the systems described herein can improve deliver operations by indicating to the carrier where items to be delivered are located within the vehicle when the vehicle is at or near a delivery point.

Figure 4:
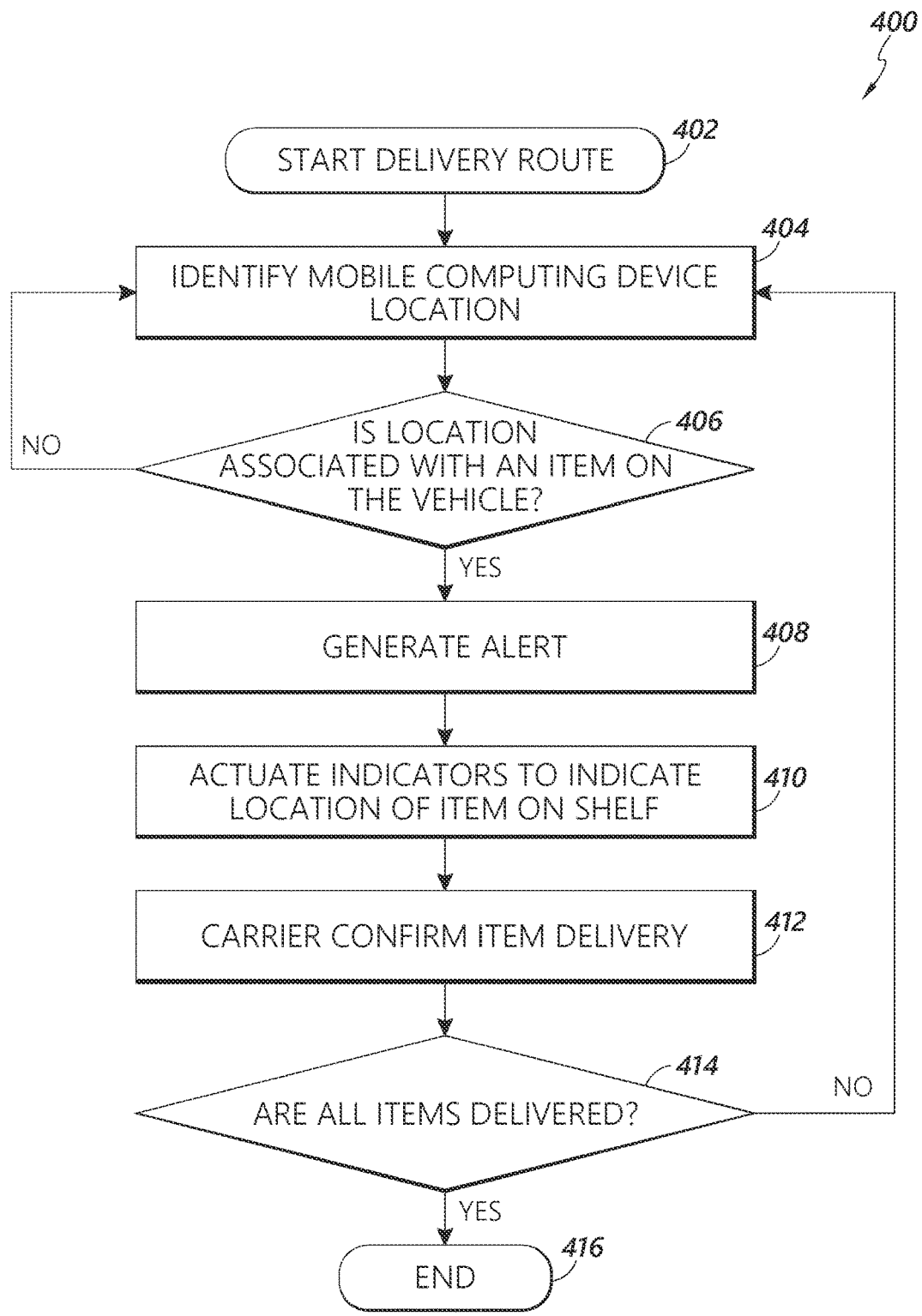
FIG. 4 is flow chart describing an exemplary process for delivering item using a vehicle having indicators on shelves in the delivery vehicle.

FIG. 4 depicts a process for delivering the items loaded, using a process similar to that described in FIG. 3, into a cargo portion 102 of a vehicle 100. As illustrated in FIG. 4, process 400 begins when the carrier starts her route in step 402. To start the delivery route, the carrier's route can be programed into the mobile computing device 220. The mobile computing device 220 can then obtain geographic coordinate data, such as GPS data, for each delivery point along the delivery route. In some embodiments, the geographic coordinate data is stored on the mobile computing device 220. In some embodiments, the geographic coordinate data for the delivery points is stored in the item database 230.

As the carrier travels along the delivery route, the process 400 moves to step 404, wherein the location module 225 identifies the location of the mobile computing device 220, which is being carried or transported by the carrier, such as in the vehicle 100 or on the carrier's person. In some embodiments, the mobile computing device 220 transmits its geographic location to the controller 210 at periodic intervals, such as once a second, or more or less frequently. The mobile computing device 220 can communicate the location of the carrier continuously, at intervals, or it can be requested by the controller 210, or both. The communication hub 210 can communicate the location of the mobile computing device 220 to the item database 230, to the on-vehicle controller 240, or to both.

The system 200 identifies the location of the mobile delivery device 220 as corresponding to a delivery point or an address. The location can be identified when the mobile computing device 220 enters into a geofence associated with the delivery point, address, or location to which delivery is intended. In some embodiments, the mobile computing device 220 can determine it is near a delivery point or address based on the distance and/or time since the previous address or delivery, which may be associated with a scan of an item. In some embodiments, the location can be identified at a predetermined time before the carrier will be at a particular location, such as the immediately preceding location, or 1 to 2 minutes before the carrier is to arrive at a location. The mobile computing device 220 can anticipate what the upcoming location, delivery point, or address is, based on GPS coordinates and the carrier's route, and query the manifest of items on the vehicle for delivery before the carrier is actually physically at a particular location or delivery point.

When the location of the mobile computing device 220 is identified in step 404, the process 500 moves to decision state 406, wherein it is determined whether the location of the mobile computing device 220 is associated with an item in the manifest on the vehicle 100 intended for delivery along the carrier's route. The mobile computing device 220 or the controller 210 can query the manifest, the on-vehicle controller 240 or the item database 230 according to the delivery point, using the address, geographic coordinates, and the like. In some embodiments, the mobile computing device 220 can sent a request to the item database 230, which will query the manifest and determine if an item is intended for delivery to the delivery point associated with or corresponding to the location of the mobile computing device 240.

If no item for the location of the mobile computing device 220 is on the manifest, or no item is intended for delivery to the delivery point where the mobile computing device 220 is located, then the process returns to step 404.

If the location identified in decision state 406 is associated with an item in the manifest, the process 400 moves to step 408, wherein the mobile computing device 220 creates an alert. The alert can signal, warn, or notify the carrier that an item intended for delivery to the carrier's current location is on the vehicle 100.

The process 400 moves to step 410, wherein the indicator 122 or 114 indicate the location of the item on the shelves 120*a-d* that is for delivery at the delivery point associated with the current location of the mobile computing device 220. The controller 210 or the on-vehicle controller 240 can determine from the stored loading information, where the item is on the shelves 120*a-d* or floor area 112*a-b*, and send a signal to the indicators 122 or 114 corresponding to the item location to light up, or otherwise indicate. The indicators 122 or 114 can illuminate or flash, or otherwise signal to help the carrier to quickly and easily identify the location of the item to be delivered to the current delivery point.

The process 400 moves to step 412, wherein the carrier confirms she has picked-up the item from the shelf 120*a-d* or floor storage area 112*a-b*, or delivered the item to the delivery point. This can be done by scanning a label on the item, such as labels described elsewhere herein. The mobile computing device 220 can be used to scan the label, and the label information and the scan information can be sent to the controller 210 to update the item database 230 regarding item delivery, and to provide notifications. After the item has been picked up and/or scanned, the indicators 114 or 122 can deactivate or turn off.

The process 400 then moves to decision state 414, wherein it is determined whether there are more items to be delivered. If the on-vehicle controller 240, the controller 210, or item database 230, or any combination of these components determines that there are still items on the vehicle to be delivered along the carrier route, the process 400 returns to step 404, and the process repeats. If there are no further items to be delivered, the process 400 moves to step 416 and ends.

Figure 5C:
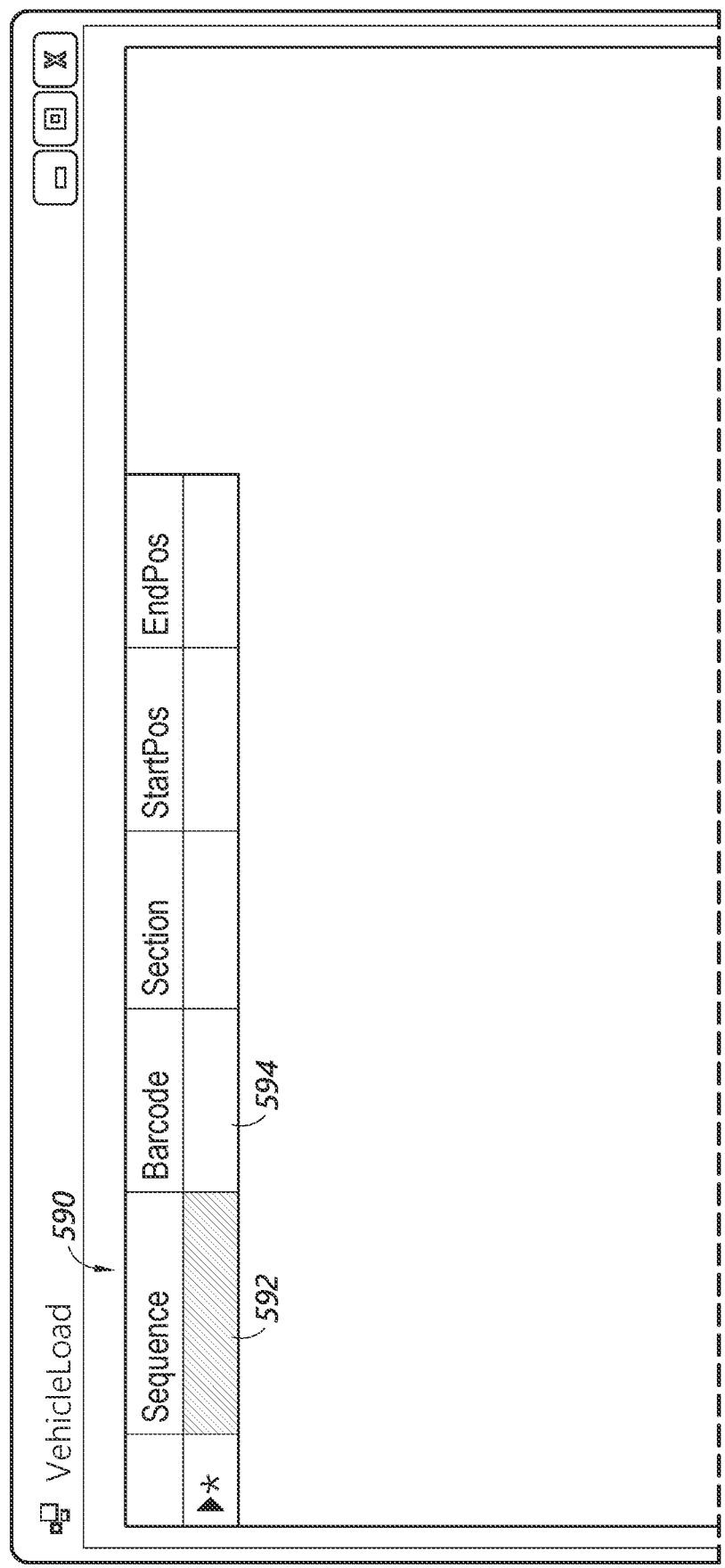
FIG. 5C depicts an embodiment of a table populated during vehicle loading operations.

FIGS. 5A-C depict screen images available on the mobile computing device or on another device, such as an interface with the controller 210, and depict tables for storing information used in the systems and methods described herein.

FIG. 5A shows an item table 560 having an identifier field 562, dimensions fields 564, and address fields 566. The identifier field 562 can store a unique identifier for each item in the distribution network, or which is intended for delivery to a given geographic area, and can store other data as desired. The dimensions fields 564 can store item dimensions, including size and weight. The address fields 566 can store information about the delivery point for the item. The item table 560 can be stored in the item database 230 or on the mobile computing device 220, or in any other desired location. The item table 562 can be populated as items are inducted into the mail stream.

FIG. 5B depicts a stop table 580. The stop table 580 can be stored in the mobile computing device 220 or the controller 210, or in the on-vehicle controller 240, or in any other desired location. The stop table 580 includes a stop field 582 and address fields 584. The stop table 580 can exist for each route and can identify each delivery point in sequence along a route. In some embodiments, the stop table 580 can be generated as items are scanned or inducted, and the only stops listed on the stop table will be those having packages or parcels to deliver. The stop table 580 can be generated after an item is scanned and the address data of the destination point is identified. The item database 230, or other system, as described above can have the sequence of delivery points for a given route. As an item is scanned and loaded into the item table 560, the controller 210, the on-vehicle controller 240, or the mobile computing device 220 looks up the stop number for the item in the stop table 580, which can be stored, for example, in the item database 230, which corresponds to the delivery point stored in the address fields 566.

FIG. 5C depicts a vehicle load table 590. The vehicle load table 590 includes a sequence field 592, an identifier field 594, and other fields. The vehicle load table 590 can be populated as items are scanned. For example, when a carrier begins loading the vehicle 100 before starting a delivery route, the vehicle load table 590 contains no entries. As the items are scanned, the controller 210 obtains information to populate the item table from the item table 560 corresponding to the unique identifier scanned on the item and from stop table 580 corresponding to the stop number for the addresses identified in the item table. The item table 560 is populated for each item scanned, and the item table 560 is sent to the on-vehicle controller 240, which uses the information from the item table to assign potential shelf positions to the items, as described herein. When a proposed shelf location has been identified and the item has been confirmed to be loaded in that location, the shelf location of the item can be stored in the vehicle load table 590, for access as the carrier is out on the delivery route.

Figure 6A:
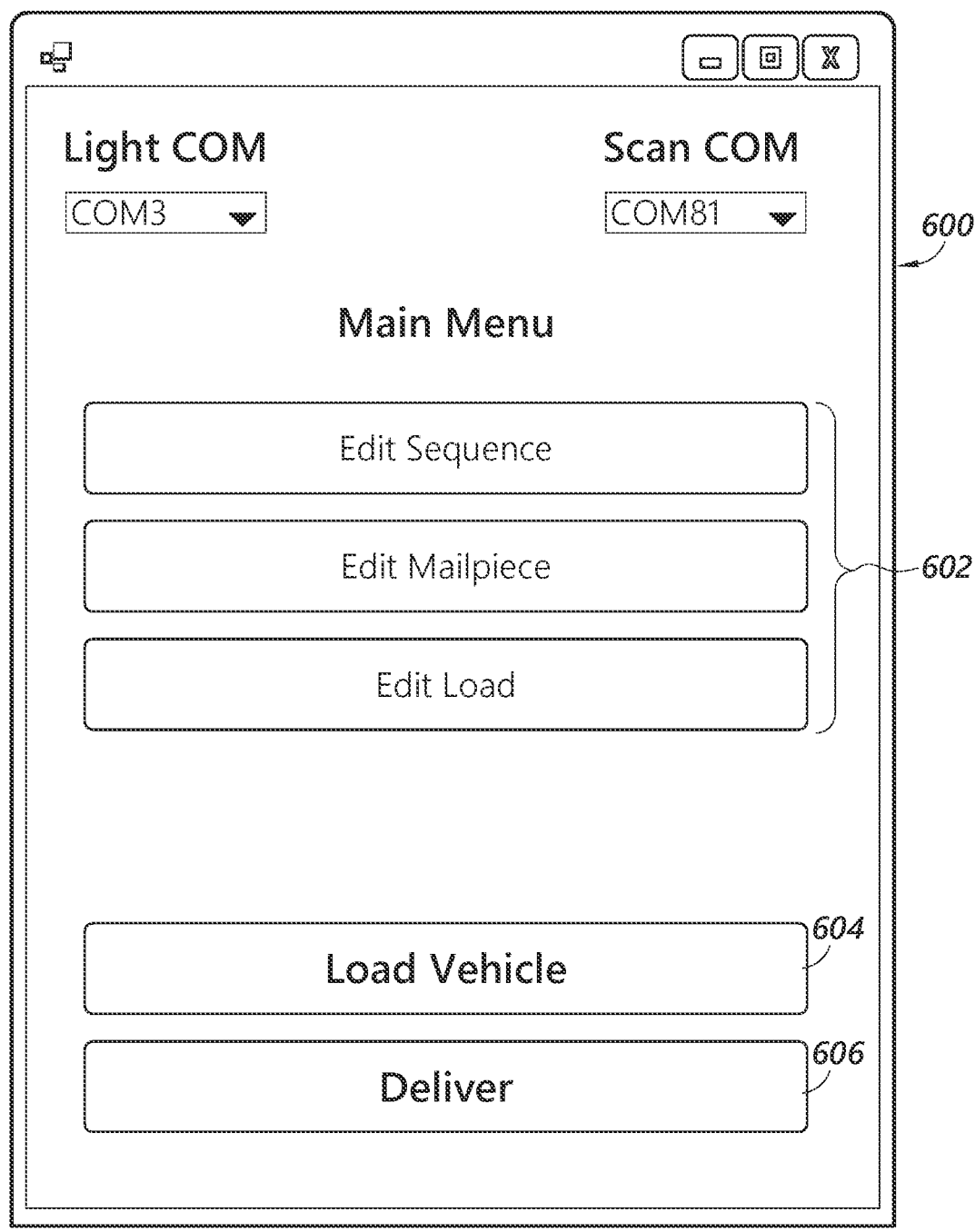
FIG. 6A depicts an exemplary interface screen for use in loading and delivering items.

FIG. 6A depicts an example of an interface screen for use by a carrier or other distribution network personnel while loading or delivering items. The interface 600 can be displayed on the mobile computing device 220, or on any other computing device within the system 200. For ease of explanation, the discussion of the interface will use the mobile computing device 220 interface as an example. The interface 600 has several buttons, including load editing buttons 602, a load button 604 and a deliver button 606. The load editing buttons allow a carrier access to edit the tables shown in FIGS. 5A-C to correct errors, to update information, and/or to manually enter an item, for example, if a computer readable code cannot be read. In some embodiments, these load editing buttons 602 are only accessible by a supervisor, or are not visible or available to the carrier.

The load vehicle button 604 initiates the loading processes described herein, for example, as described with regard to FIG. 3. The deliver button 606 initiates the delivery processes described herein, for example, as described with regard to FIG. 4.

Figure 6B:
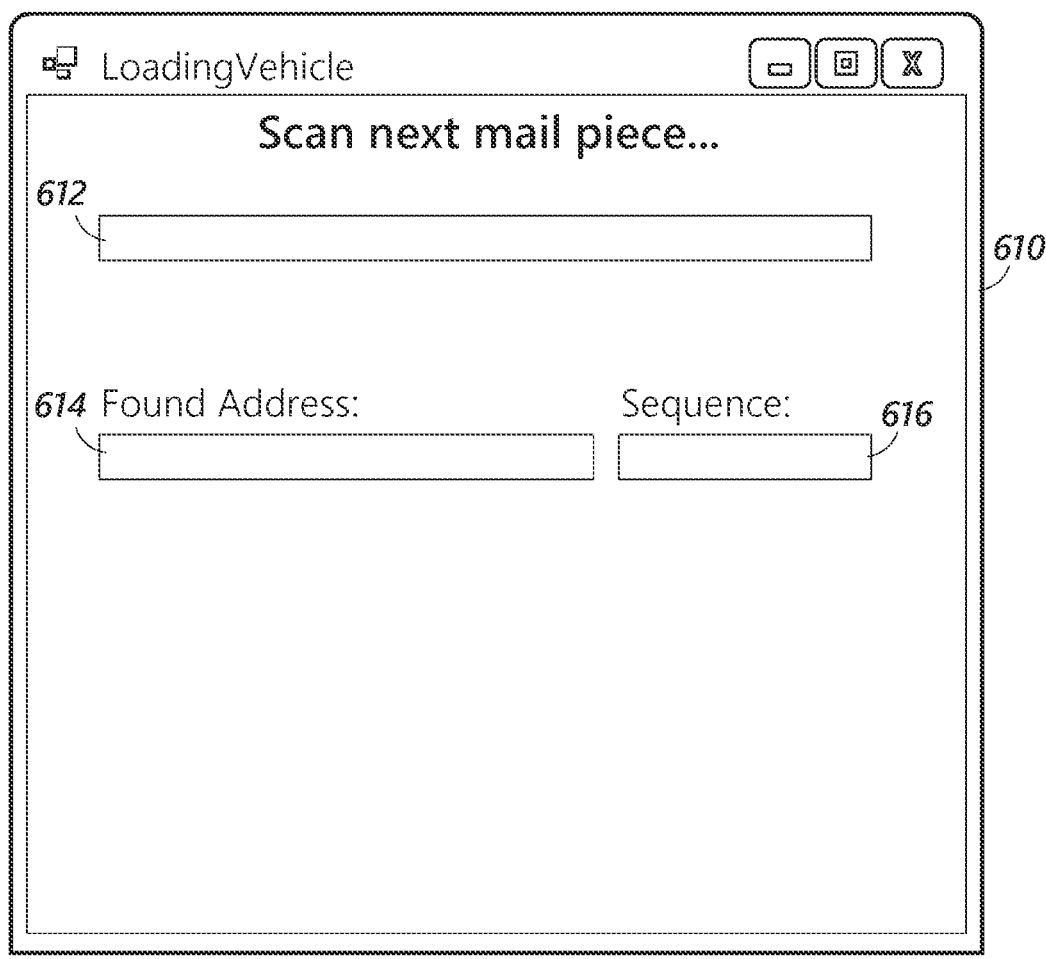
FIG. 6B depicts an exemplary interface screen for loading a vehicle.

FIG. 6B depicts an exemplary load interface 610. The load interface 610 can include an instruction to scan an item, such as a mailpiece. The carrier scans a mailpiece, similar to the process described in step 302 of FIG. 3. When the computer readable label on the item is scanned, the controller 210, the mobile computing device 220, and/or the on-vehicle controller 240 can query the item database 230, for example, the item table 560, to identify a record associated with a unique identifier encoded or stored in the computer readable label. The unique identifier for the item can be displayed in an identifier field 612. When a record is identified in the item table 560, the address or delivery point of the scanned item can be populated in a found address field 614.

The controller 210, the mobile computing device 220, and/or the on-vehicle controller 240 can query the item database 230, for example, the stop table 580, to identify the stop number associated with the address or delivery point corresponding to the scanned item. the stop number can then be populated in the sequence field 616.

Figure 6C:
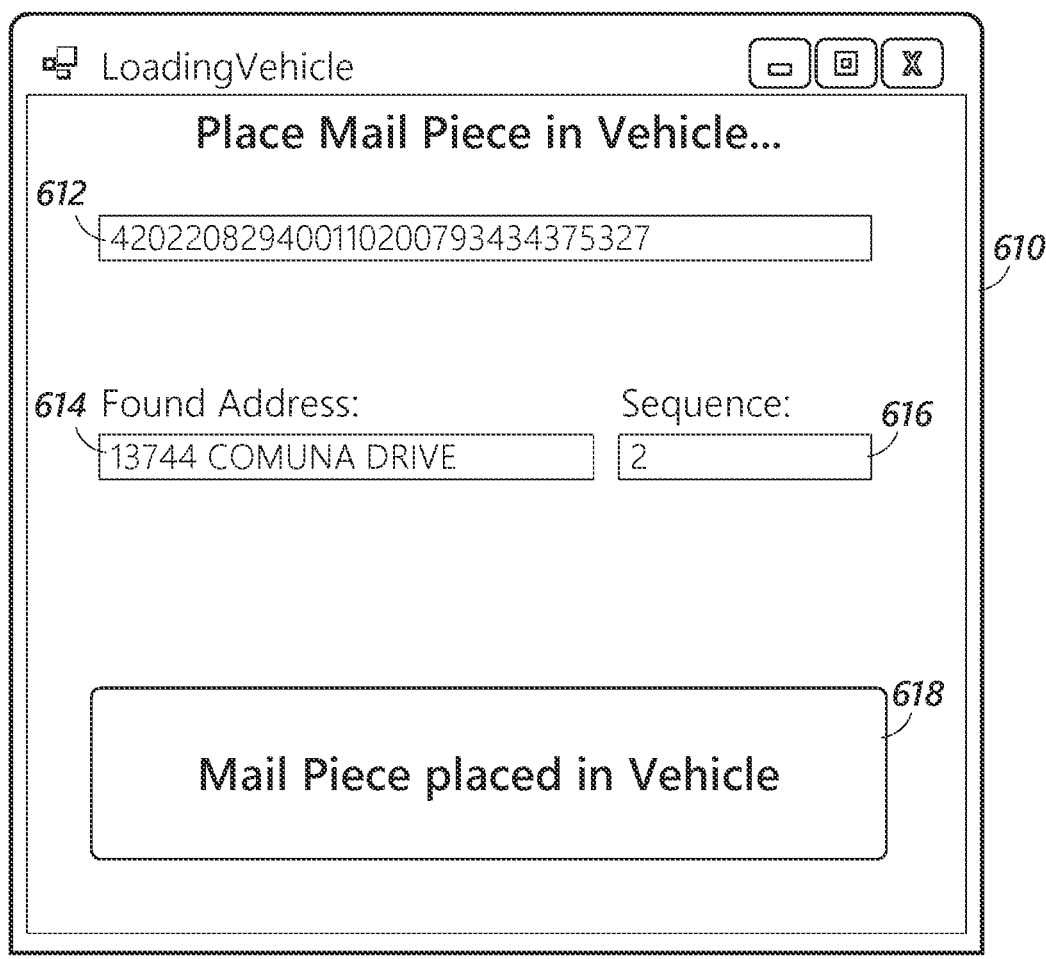
FIG. 6C depicts an exemplary interface screen for loading a vehicle having values populated therein.

FIG. 6C shows an example of the load interface having values populated in the identifier field 612, the found address field 614, and the sequence field 616. FIG. 6C further depicts the load interface 610 having a load confirmation button 618. As described elsewhere herein, after scanning an item, the indicators 122, 114 will indicate where to place the item within the vehicle. Once the carrier has placed the item in the indicated location, the carrier can press the load confirmation button 618. Pressing the load confirmation button 618 triggers the mobile computing device 220 to move to a state where it can accept a scan of the next item, such as by displaying interface 600 for the next item to be scanned.

When all items have been scanned and loaded on the truck, the carrier can press the deliver button 606 to cause the mobile delivery device to run the delivery program, similar to that described with regard to FIG. 4.

Figure 7:
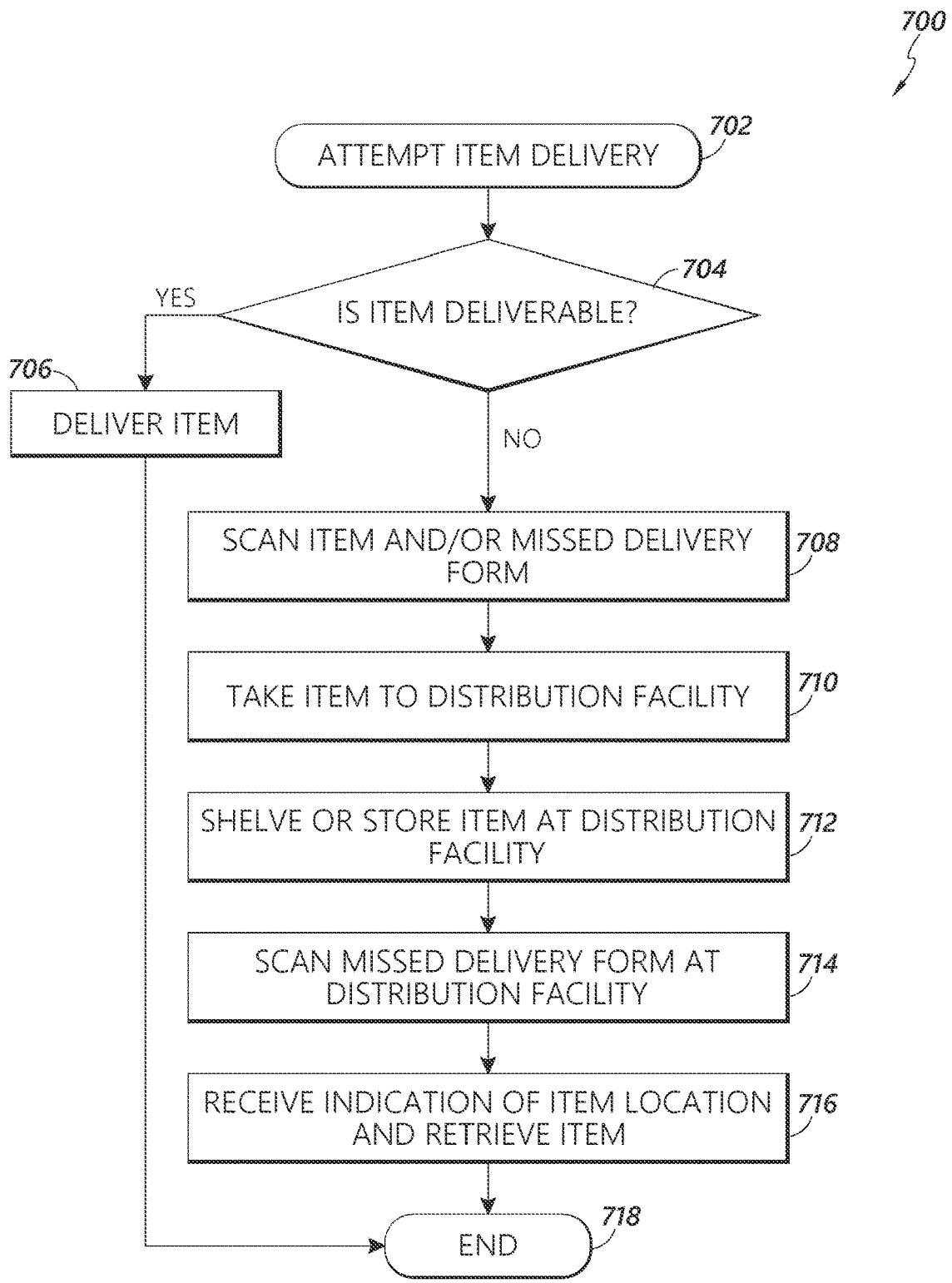
FIG. 7 is a block diagram of an embodiment of a system delivering items.

FIG. 7 depicts a process for handling an item which was not intended for or was unable to be delivered to the actual home or business of the intended recipient. A process 700 begins in block 702, wherein an item delivery attempt is made. Process 700 can occur during the delivery process described with regard to FIG. 4. The process moves to decision state 704, wherein it is determined whether the item can be delivered. An item may not be deliverable where the item requires a signature, additional postage, has security requirements, such as delivering certain pharmaceuticals, where the item is perishable, or where the recipient as requested delivery to a different location. If the item can be delivered, then process moves to block 706, where the item is delivered. The process moves to block 718, and ends.

When the item cannot be delivered, the process 700 moves to block 708, wherein the carrier scans a code on the item and a code on the delivery form. By scanning the item and a computer readable code on a missed delivery form using the mobile computing device 220, the item is associated with the code on the missed delivery form, and the association is stored by the controller 210, for example, in the item database 230. The carrier leaves the missed delivery form with the recipient, such as in a mailbox, in a secured receptacle at the delivery point, and the like.

Process 700 moves to block 710, wherein the carrier takes the non-delivered item to the distribution facility. Process 700 moves to block 712, wherein the item is scanned at the distribution facility via a scanner, such as the mobile computing device 220, and a proposed shelf location is provided for the item by the controller 211, similar to the process described with regard to FIG. 3. When the shelf location is identified, the item is stored or placed on the shelf or in the storage location. The location of the item on the shelf or in the storage area is associated with the item in an item record, and stored by the controller 211.

Process 700 moves to block 714, wherein the missed delivery form is scanned at the distribution facility. To scan the missed delivery form at the distribution facility, the intended recipient brings the missed delivery form, which was left at the delivery point. The clerk or other person at the distribution facility scans the code on the missed delivery form with a scanner at the distribution facility. The scanner is in communication with the controller 211. The controller 211 provides the location of the item associated with the missed delivery form by obtaining the shelf or storage area associated with the item when the item was shelved in block 712. The location of the item can be signaled or provided similar to the process described in FIG. 3.

The clerk or other person retrieves the item from the indicated location and provides the item to the intended recipient. In some embodiments, the intended recipient can use an automated kiosk to scan the code on the missed delivery form. This scan will alert an employee to retrieve the item. In some embodiments, the items are stored or shelved in electronic lockers or in accessible storage locations. For example, when the missed delivery form is scanned, the electronic locker in which the item is located can be opened, and the recipient can retrieve the item. In some embodiments, a key can be provided to the recipient after the scan at the automated kiosk that will open a storage area where the item is stored or shelved.

When the intended recipient receives the item, the process 700 then ends in block 718.

In some embodiments, if the item is not picked up at the distribution facility before the next scheduled delivery day, the items can be reloaded onto a vehicle for a second, third, etc., attempt at delivery. In this case, at the beginning of the day, a manifest of items which were previously stored or shelved in the distribution facility, such as in blocks 710 and 712, is provided to a carrier. The carrier may receive a list of items which are to be delivered to delivery points along the carrier's assigned route. The carrier can receive a printout with codes that the carrier can scan, which will cause the indicators on the shelves in the distribution facility to indicate where the items to load are located. In some embodiments, the carrier's mobile computing device 220 will indicate which items are to be loaded, and provide an identification of their locations on the shelves in the distribution facility. The carrier can then retrieve the items, load them onto the vehicle, and deliver them as described with regard to FIG. 3.

The present disclosure refers to processor-implemented steps for processing information in the system. Instructions can be implemented in software, firmware or hardware processors and include any type of programmed step undertaken by components of the system.

The system may be used in connection with various operating systems such as Linux®, UNIX®, MacOS®, or Microsoft Windows®. The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

We claim:

1. A system for delivering items comprising:
a plurality of items stored on a plurality of shelves in a delivery vehicle, each of the plurality of shelves including an indicator, the indicator comprising a plurality of segments, each of the plurality of segments comprising a plurality of indicating components;
a mobile computing device comprising a geographic location system;
a memory storing a location of each of the plurality of items stored on the plurality of shelves in the delivery vehicle;
a processor in communication with the memory, wherein the processor is configured to:
receive the geographic location of the mobile computing device;
determine whether the geographic location of the mobile computing device is within a defined distance of a delivery point to which one of the plurality of items loaded is to be delivered on a fixed route;
if the geographic location of the mobile computing device within the defined distance to the delivery point, query the memory to determine the location of the one of the plurality of items on the plurality of shelves, wherein the location of the one of the plurality of items is based on an intended destination and an order of an intended delivery point for the one of the plurality of items;
actuate selected ones of the plurality of indicating components corresponding to the location of the item to be delivered to the delivery point; and
activate an alert on the mobile computing device indicating that there is an item to be delivered to the delivery point.

2. The system of claim 1 wherein the plurality indicating components comprise a plurality of light emitting diodes aligned along a length of each of the plurality of shelves.

3. The system of claim 2, wherein the plurality of indicating components comprise a plurality of light emitting diodes.

4. The system of claim 3, wherein the processor is further configured to actuate selected ones of the plurality of indicting components by illuminating a set of the plurality of light emitting diodes extending along a length of one of the plurality of shelves.

5. The system of claim 4, wherein the set of the plurality of light emitting diodes extends a distance along the one of the plurality of shelves corresponding to a dimension of the item to be delivered.

6. The system of claim 1, wherein the mobile computing device is incorporated into the vehicle.

7. The system of claim 1, wherein the mobile computing device is a handheld mobile delivery device.

8. The system of claim 1, wherein the location of the one of the plurality of items is based on a dimension of the one of the plurality of items.

9. A method for delivering items comprising:
storing a plurality of items on a plurality of shelves in a delivery vehicle, each of the plurality of shelves including an indicator, the indicator comprising a plurality of segments, each of the plurality of segments comprising a plurality of indicating components spaced a fixed distance apart, wherein the location of the one of the plurality of items is based on an intended destination and an order of an intended delivery point for the one of the plurality of items;
determining, by a mobile computing device, a geographic location of the mobile computing device;
storing, in a memory, a location of each of the plurality of items stored on the plurality of shelves in the delivery vehicle;
receiving, in a processor, the geographic location of the mobile computing device;
determining, in a processor, whether the geographic location of the mobile computing device is within a defined distance of a delivery point to which one of the plurality of items is to be delivered;
if the geographic location of the mobile computing device within the defined distance to the delivery point, querying the memory to determine the location of the one of the plurality of items on the plurality of shelves;
actuating, by a processor, selected ones of the plurality of indicating components corresponding to the location of the item to be delivered to the delivery point; and
activating an alert on the mobile computing device indicating that there is an item to be delivered to the delivery point.

10. The method of claim 9, wherein the plurality indicating components comprise a plurality of light emitting diodes aligned along a length of each of the plurality of shelves.

11. The method of claim 10, wherein the plurality of indicating components comprise a plurality of light emitting diodes.

12. The method of claim 11, actuating selected ones of the plurality of indicting components comprises illuminating a set of the plurality of light emitting diodes extending along a length of one of the plurality of shelves.

13. The method of claim 12, wherein the set of the plurality of light emitting diodes extends a distance along the one of the plurality of shelves corresponding to a dimension of the item to be delivered.

14. The method of claim 9, wherein the mobile computing device is incorporated into the vehicle.

15. The method of claim 9, wherein the mobile computing device is a handheld mobile delivery device.

16. The method of claim 9, wherein the location of the one of the plurality of items is based on a dimension of the one of the plurality of items.

* * * * *